United States Patent
Dullien (12)

(10) Patent No.: US 6,355,080 B1
(45) Date of Patent: Mar. 12, 2002

(54) MECHANICAL SEPARATOR FOR STACK EFFLUENTS AND RELATED METHOD FOR MAKING SAME

(75) Inventor: Francis A. L. Dullien, RR #1, Drumbo, Ontario (CA), N0J 1G0

(73) Assignees: Institut Francais du Petrole, Rueil-Malmaison Cedex (FR); Francis A. L. Dullien, Ontario (CA)

(*) Notice: Subject to any disclaimer, the term of this patent is extended or adjusted under 35 U.S.C. 154(b) by 0 days.

(21) Appl. No.: 09/446,615

(22) PCT Filed: Apr. 21, 1999

(86) PCT No.: PCT/FR99/00949

§ 371 Date: Apr. 19, 2000

§ 102(e) Date: Apr. 19, 2000

(87) PCT Pub. No.: WO99/55443

PCT Pub. Date: Nov. 4, 1999

(30) Foreign Application Priority Data

Apr. 28, 1998 (FR) .............................. 98 05458

(51) Int. Cl.$^7$ .............................................. B01D 39/16
(52) U.S. Cl. ...................... 55/523; 55/385.3; 55/527; 422/180; 502/439; 502/527.19; 502/527.24
(58) Field of Search .............................. 55/385.3, 522, 55/523, DIG. 28, DIG. 30, 527; 422/180; 502/439, 527.19, 527.24

(56) References Cited

U.S. PATENT DOCUMENTS

| | | | | |
|---|---|---|---|---|
| 3,022,187 A | * | 2/1962 | Eyraud et al. | 55/523 |
| 3,920,428 A | * | 11/1975 | Kinsley, Jr. | 55/DIG. 30 |
| 4,251,239 A | * | 2/1981 | Clyde et al. | 55/523 |
| 4,732,593 A | * | 3/1988 | Kondo et al. | 55/523 |
| 5,171,335 A | * | 12/1992 | Kojima et al. | 55/523 |
| 5,456,833 A | * | 10/1995 | Butcher et al. | 55/523 |

* cited by examiner

*Primary Examiner*—David A. Simmons
*Assistant Examiner*—Minh-Chau T. Pham
(74) *Attorney, Agent, or Firm*—Antonelli, Terry, Stout & Kraus, LLP

(57) ABSTRACT

A mechanical separator intended to collect particles contained in gaseous effluents smaller than or of the order of one micrometer in size, includes at least one channel for turbulent flow of the effluents, preferably several parallel channels formed in a porous structure having particle collection surfaces. The separator also has a series of small elements made of ultrafine fibers, the elements being fixed to the surface of the particle collecting surfaces.

17 Claims, 1 Drawing Sheet

MECHANICAL SEPARATOR FOR STACK EFFLUENTS AND RELATED METHOD FOR MAKING SAME

FIELD OF THE INVENTION

The present invention relates to the field of separators and more specifically to means intended to separate droplets or particles of a gaseous stream, smaller than or of the order of one micrometer in size.

BACKGROUND OF THE INVENTION

Many methods and devices have already been disclosed for this purpose.

U.S. Pat. No. 5,626,651 describes a process and a system of this type where the turbulent gas stream flows above a series of plates defining non-turbulent zones in which the particles are collected. More precisely, the plates are parallel to each other and vertical. A filtering means consisting of fibers can further be provided between said plates in order to improve filtering, notably of the finer particles.

International patent application WO-95/28,217 describes a device based on the is same principle, but in which the plates are provided with slots or replaced by grates. Carcasses made of wire mesh covering a fiber mat are furthermore used in this prior art.

Besides, patent application WO-97/00,102 relates to a separator placed at the exhaust of diesel engines, intended to collect the particles contained in the exhaust gases. A honeycomb structure pierced with channels perpendicular to the opening of the honeycomb cells is preferably provided. The porosity of such a structure is of the order of 70%. However, this device cannot be used for mists because the droplets captured in he cells cannot be drained off.

International patent application PCT/FR-97/00,164 relates to a separator for mists, having one or more vertical delivery channels laterally delimited by fibrous corrugated elements. An agglomerator is furthermore necessary upstream from the separator in order to have larger particles that can be separated in the separator. This is however relatively costly and implies considerable pressure drops.

However, these well-known means do not allow to efficiently collect and remove particles and/or droplets smaller than about one micrometer: in U.S. Pat. No. 5,626,651, the particles captured accumulate on the walls, then fall to the bottom of the device under the effect of gravity. Means intended to shake the walls are often necessary to cause the particles accumulated on the walls to fall. This device pose problems for separation of very fine particles smaller than one micrometer. In fact, in this case, the channel must be very small in height and therefore the plates very high so that the equipment is very bulky for a very small sectional area of flow. The same problem exists in the device according to document WO-95/28,217.

In patent application WO-97/00,102, the particles collected are oxidized.

SUMMARY OF THE INVENTION

The present invention proposes solving the problem of removal of particles and/or droplets smaller than or of the order of one micrometer in size in an original and unexpected way, as explained hereafter.

The present invention advantageously prevents any pressure drop due to clogging of zone of the device. The pressure drop remains constant throughout the life of the separator according to the invention.

The present invention allows to remove particles present for example in exhaust gases of vehicles equipped with diesel engines, in the dusts of more or less confined inner spaces, in fumes of all sorts such as metallurgical fumes, or acid fumes.

The global structure of the invention can be the structure described in patent application WO-97/00,102 or in French patent application EN.97/12,867 filed by the applicant. Other support materials can also be used as explained hereafter.

In relation to the devices listed above, the particle collection rate can be increased very significantly by means of the invention.

The object of the present invention is thus a mechanical separator intended to collect particles contained in gaseous effluents and smaller than or of the order of one micrometer in size, comprising at least one channel for turbulent flow of the effluents, preferably several parallel channels formed in a porous structure having particle collection surfaces, and whose points stick out irregularly.

The separator according to the invention further comprises a series of small elements made of ultrafine fibers, said elements being both permanently interlocked with each other and with the surface of said particle collecting surfaces, and whose points stick out irregularly.

More precisely, said fibers are of the order of one micrometer in diameter.

Furthermore, said fibers are less than about one millimeter in length.

According to the invention, said interlocked elements form a layer that is less than about one millimeter thick.

In accordance with an embodiment of the invention, the porous structure comprises a ceramic honeycomb.

According to another embodiment of the invention, the porous structure comprise a cross-linked polyurethane foam.

According to another embodiment of the invention, the porous structure comprises a ceramic cross-linked foam made from a group comprising alumina, cordierite, mullite, zirconia, sialon, silicon carbide.

More precisely, said ceramic cross-linked foam has a porosity ranging between 70% and 90%.

In particular, the length of the separator according to the invention ranges between about 10 cm and about 100 cm.

According to a particular embodiment of the invention, the separator comprises several parallel or substantially parallel channels.

The number of delivery channels is preferably proportional to the flow rate of the gaseous effluents.

The invention further relates to a process for manufacturing a separator as described above.

The process according to the invention comprises the following stages:

dipping a porous structure comprising delivery channels in a first solution, taking said structure out of the first solution, passing an air stream for about one hour through the channels of said structure, dispersing small ultrafine fiber elements in the air stream letting the small elements settle from the turbulent air onto the collecting surfaces, made adhesive, of the porous structure so that the points of the small elements stick out of the surface irregularly,
- placing the separator in a drying oven for about one hour.

Furthermore, after the small fibrous elements have settled on the collecting surfaces, said channels are hollowed out on their initial inner section by cutting the small fibrous elements that stick out.

The first solution can consist of a mixture of Silane in a hydrocarbon solvent.

Without departing from the scope of the invention, said first solution can consist of a mixture of water, sodium silicate and ethylene glycol.

BRIEF DESCRIPTION OF THE DRAWINGS

Other features, details and advantages of the present invention will be clear from reading the description hereafter, given by way of non limitative example, with reference to the accompanying drawings wherein.

DETAILED DESCRIPTION OF THE INVENTION

Figure 1:
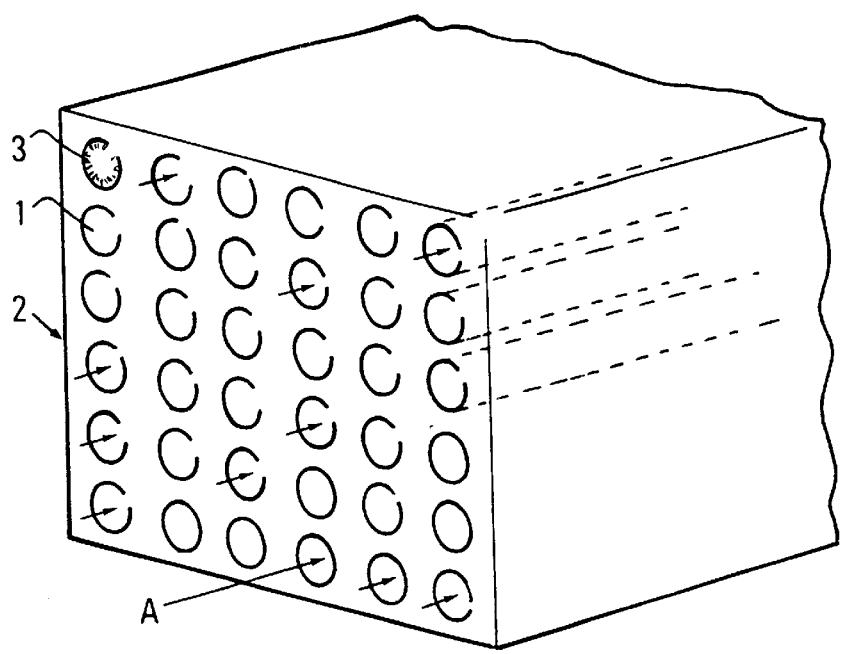
FIG. 1 is a simplified perspective of the invention.

FIG. 1 diagrammatically illustrates a part, seen in perspective, of a separator according to the invention. The separator can consist, as it is well-known, of a ceramic honeycomb monolith 2 pierced with a multitude of channels 1; it can also be made of a spongy material pierced with a multitude of channels 1. The channels are preferably parallel to each other. The turbulent stream flows conventionally through the channels as shown by arrow A.

According to the invention, a series of small elements 3 consisting of ultrafine fibers is permanently interlocked with particle collecting surfaces 4, i.e. on on the inner surfaces of porous structure 2.

In FIG. 1, small elements 3 are shown only in one of channels 1 for clarity reasons.

Preferably, notably in order not to create a pressure drop, channels 1 are hollowed out on their initial section so as to provide a free passage for the effluents.

Figure 2:
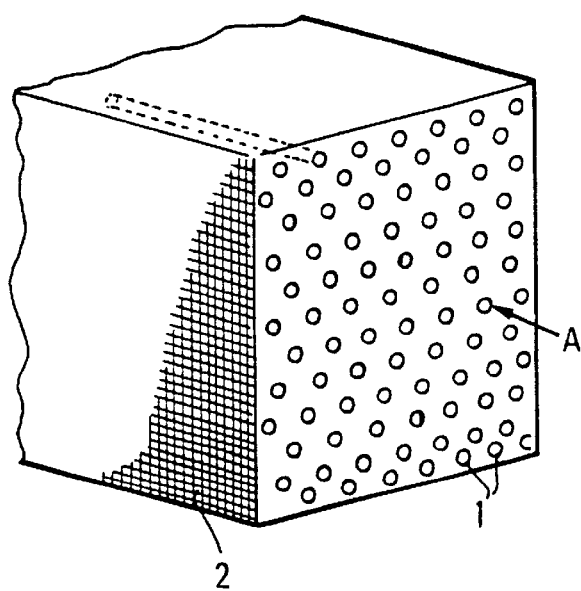
FIG. 2 is a simplified perspective of an embodiment of the invention with a ceramic honeycomb.

FIG. 2 shows a separator whose porous structure 2 is made from a ceramic honeycomb monolith.

For clarity reasons, small elements 3 are not shown.

This structure type is used, as it is well-known, in automobile catalytic converters. The monolith thus consists of capillaries of about 1 mm. Channels 1 are pierced in said structures. A separator according to this embodiment of the invention is about 20 cm long; it comprises about 90 specific delivery channels each about 5 mm in diameter.

Figure 3:
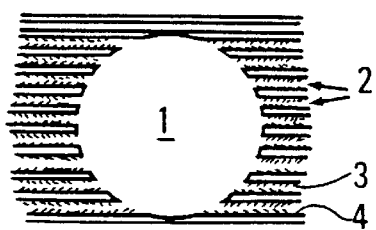
FIG. 3 is a cross-section of a channel according to the embodiment of the invention shown in FIG. 2.

FIG. 3 shows, on a larger scale, the particular layout according to the invention in a channel 1 where the gaseous effluents circulate.

Channel 1 is preferably cleared of small elements 3 that are stuck on collecting surfaces 4, thus reinforcing the particle collecting surface.

Said collecting surfaces 4 thus resemble a lawn with fine points sticking out irregularly.

Very satisfactory test results have been obtained with Kaowool (registered trademark for stable, high-temperature alumina-silica ceramic fibers) fibers about 1 $\mu$m in diameter and less than 1 mm long. The separator was 20 cm long and comprised 90 parallel channels each 5.3 mm in diameter.

Thus, 0.5-$\mu$m diameter particles have been collected with a yield of about 50%, whereas the yield is of the order of 20% with a known separator, all other things being equal.

According to the invention, the fibers can keep their capacity and their efficiency for operating temperatures up to slightly above 1000° C.

Manufacture of the separator according to the invention requires the following stages:

The porous structure is dipped in a Silane (registered trademark) solution in a hydrocarbon solvent, then air loaded with Kaowool fibers is blown into channels 1 for about one hour. Fibers 3 thus settle from the turbulent flow onto collecting surfaces 4 of porous structure 2.

When a certain fiber thickness has thus settled, channels 1 are hollowed out by any means known in the art in order to guarantee the initial sectional area of flow. This notably removes the fibers that might stick out in channels 1.

The separator is then placed in a drying oven for about one hour.

Without departing from the scope of the invention, other substances can be selected as glue, to obtain permanent adhesion of fibrous elements 3 to collecting surfaces 4.

A sodium silicate solution mixed with water to which ethylene glycol is added can be used as glue. This solution allows the drying and solidification rate of the sodium silicate to be slowed down. The separator can then withstand temperatures of the order of 1100° C.

Making the inner surfaces of the pores sticky advantageously allows to obtain, according to the invention, a layer of fibers that stick out irregularly of the surface. The process according to the invention allows to create this sticky surface to which the fibers can adhere as mentioned above, i.e. with points sticking out. This is a very interesting feature of the invention that cannot be obtained according to the prior art when a liquid layer comprising fibers is used. In fact, in this case, the fibers remain lying on the pore surfaces and do not stick out, hence a very limited efficiency.

More generally, for high temperature applications (i.e. of the order of above 1000° C.), ceramic or glass fibers will be selected. For more moderate temperatures (of the order of or below 100° C.), the fibers can consist of natural or synthetic materials such as polyesters.

Generally, the smaller the particles to be collected, the higher the improvement in the efficiency of the separator according to the invention.

I claim:

1. A mechanical separator intended for collection of particles contained in gaseous effluents smaller than or on the order of one micrometer in size, comprising a porous structure having particle collecting surfaces, at least one delivery channel, open at each end, for turbulent flow of the effluents therethrough, the at least one delivery channel being formed in the porous structure having particle collecting surfaces, and a series of fibrous elements made of ultrafine fibers on the order of one micrometer in diameter, said fibrous elements being fixed to the surface of said particle collecting surfaces, and having points which stick out irregularly, wherein the at least one delivery channel has a free passage along its length not containing the fibrous elements.

2. A separator as claimed in claim 1, wherein the length of said ultrafine fibers is less than about one millimeter.

3. A separator as claimed in claim 1, wherein the fibrous elements form a layer having a thickness less than about one millimeter.

4. A separator as claimed in claim 1, wherein the porous structure comprises a ceramic honeycomb.

5. A separator as claimed in claim 1, wherein the porous structure comprises a ceramic cross-linked foam made from a material selected from the group consisting of alumina, cordierite, mullite, zirconia, sialon, and silicon carbide.

6. A separator as claimed in claim 5, wherein the porous structure is a ceramic foam having a porosity ranging between 70% and 90%.

7. A separator as claimed in claim 1, wherein the porous structure comprises a polyurethane foam.

8. A separator as claimed in claim 1, wherein the at least one channel has a length ranging between about 10 cm and about 100 cm.

9. A separator as claimed in claim 1, wherein the porous structure comprises several parallel or substantially parallel channels.

10. A separator as claimed in claim 9, wherein the porous structure the number of channels is proportional to the flow rate of the gaseous effluents.

11. A process for manufacturing a mechanical separator, comprising:

dipping a porous structure comprising channels in a first solution to make collecting surfaces of the porous structure adhesive, taking the porous structure out of the first solution, passing an air stream through the channels of the porous structure, dispersing fibrous elements made of ultrafine fibers in the air stream, letting the fibrous elements settle from the air stream onto the collecting surfaces, made adhesive, of the porous structure so that points of the fibrous elements stick out irregularly from the collecting surfaces, and drying the separator.

12. A process as claimed in claim 11, further comprising, after the fibrous elements have settled on the collecting surfaces, hollowing out the channels to the initial inner section of the channels by cutting the fibrous elements that stick out into the channels.

13. A process as claimed in claims 11, wherein the first solution is a mixture of silane in a hydrocarbon solvent.

14. A process as claimed in claim 11, wherein the first solution is a mixture of water, sodium silicate and ethylene glycol.

15. A process as claimed in claim 11, wherein the air stream is passed through the channels for about one hour.

16. A process as claimed in claim 11, wherein the drying of the separator is carried out in a drying oven for about one hour.

17. A separator as claimed in claim 1, wherein the free passage not containing the fibrous elements has a cross section equal to the cross section of the at least one delivery channel.

* * * * *